Figure 1:
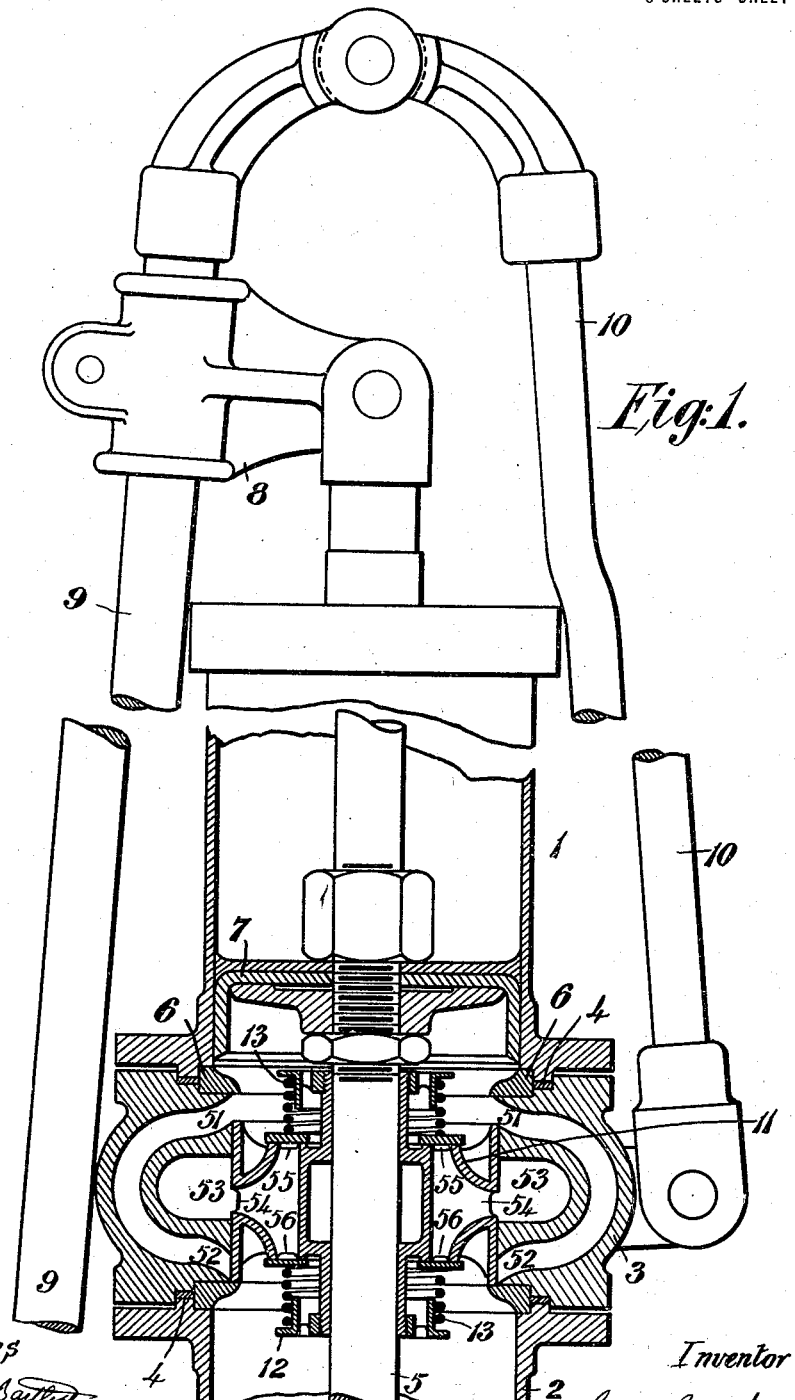

J. ZWICKY.
PUMP, ENGINE, AND THE LIKE.
APPLICATION FILED FEB. 11, 1915.

1,203,682.

Patented Nov. 7, 1916.
8 SHEETS—SHEET 1.

Witnesses
Edwin D Bartlett
E. D. Briese.

Inventor
Jean Zwicky
per Herbert Sefton Jones
Attorney.

J. ZWICKY.
PUMP, ENGINE, AND THE LIKE.
APPLICATION FILED FEB. 11, 1915.

1,203,682.

Patented Nov. 7, 1916.
8 SHEETS—SHEET 2.

Witnesses.
Edwin D Bartlett
E. D. Breese.

Inventor.
Jean Zwicky
per Herbert Sefton Jones
Attorney

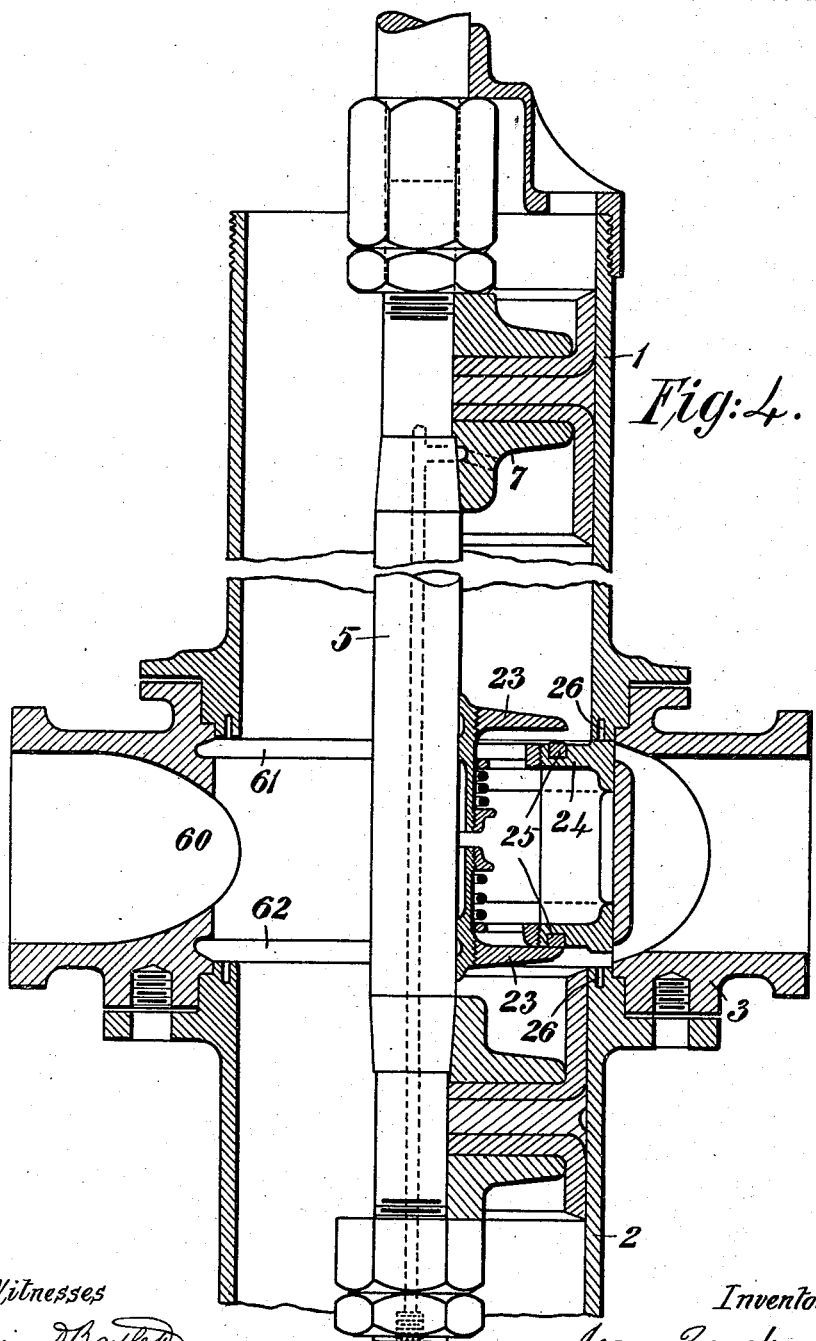

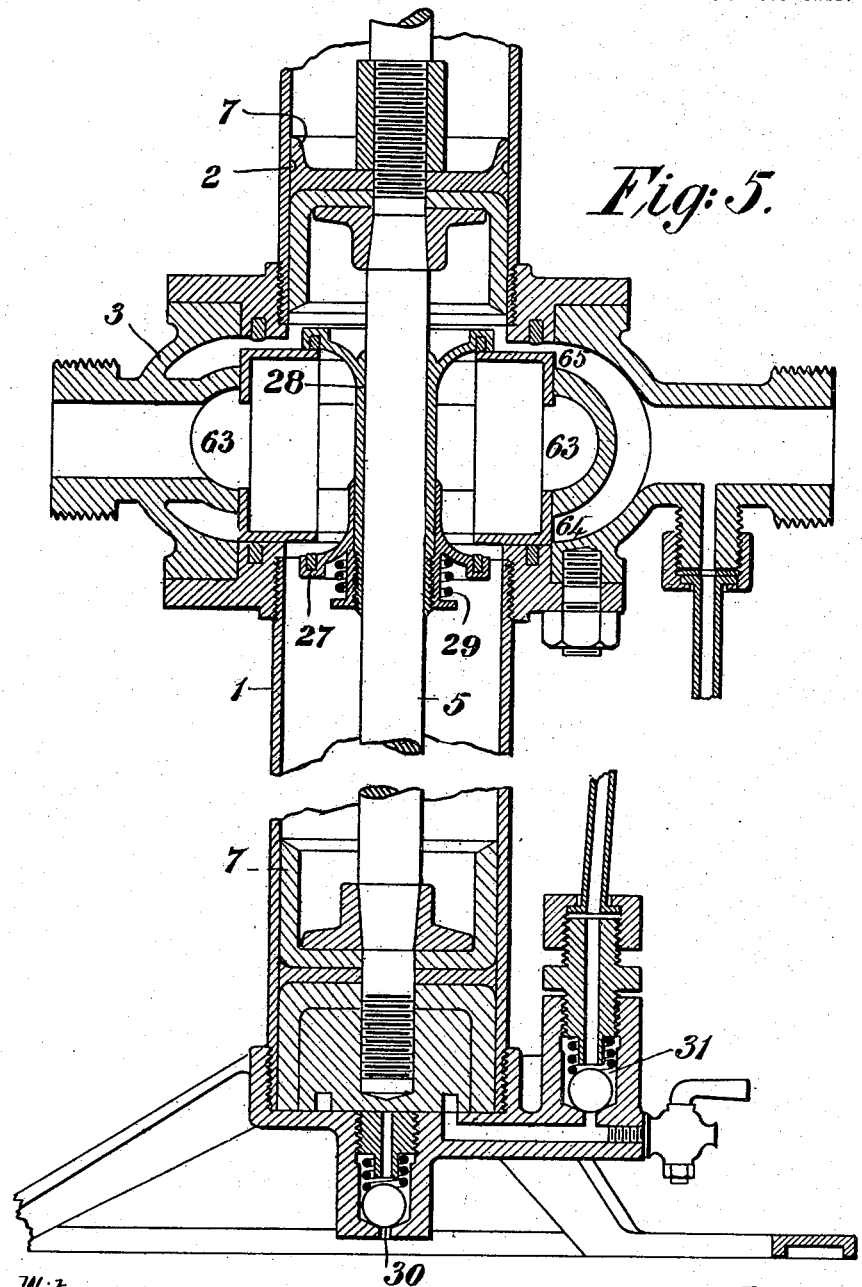

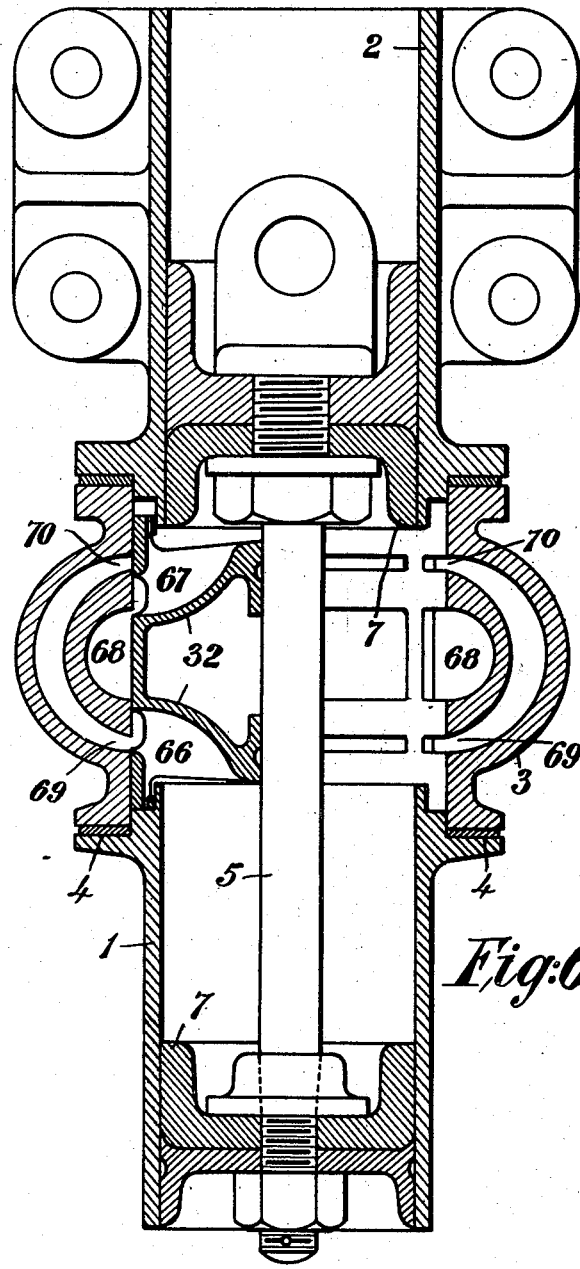

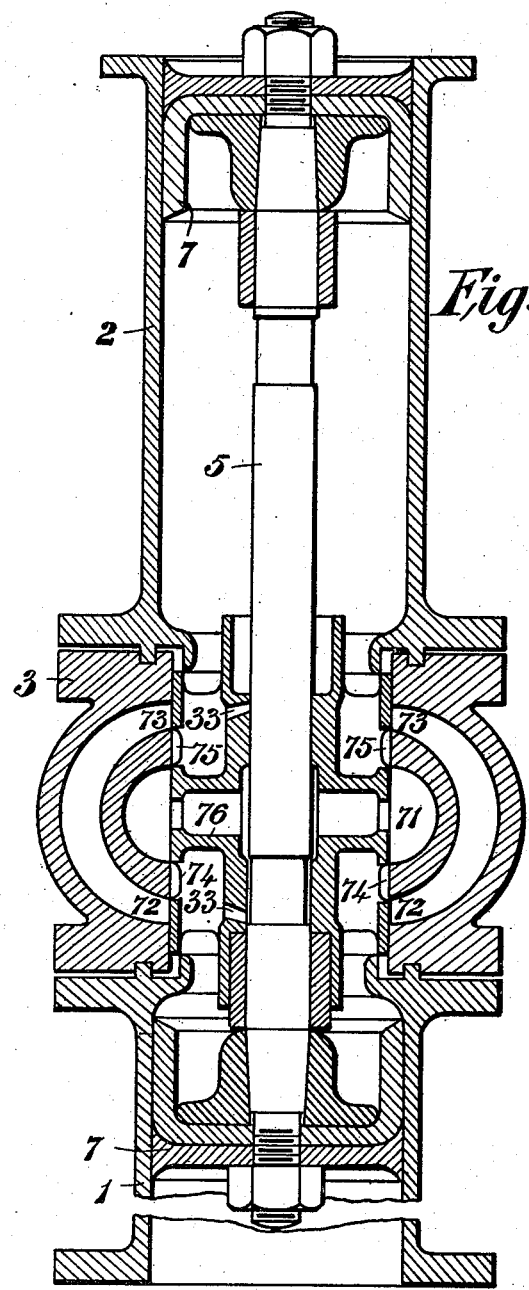

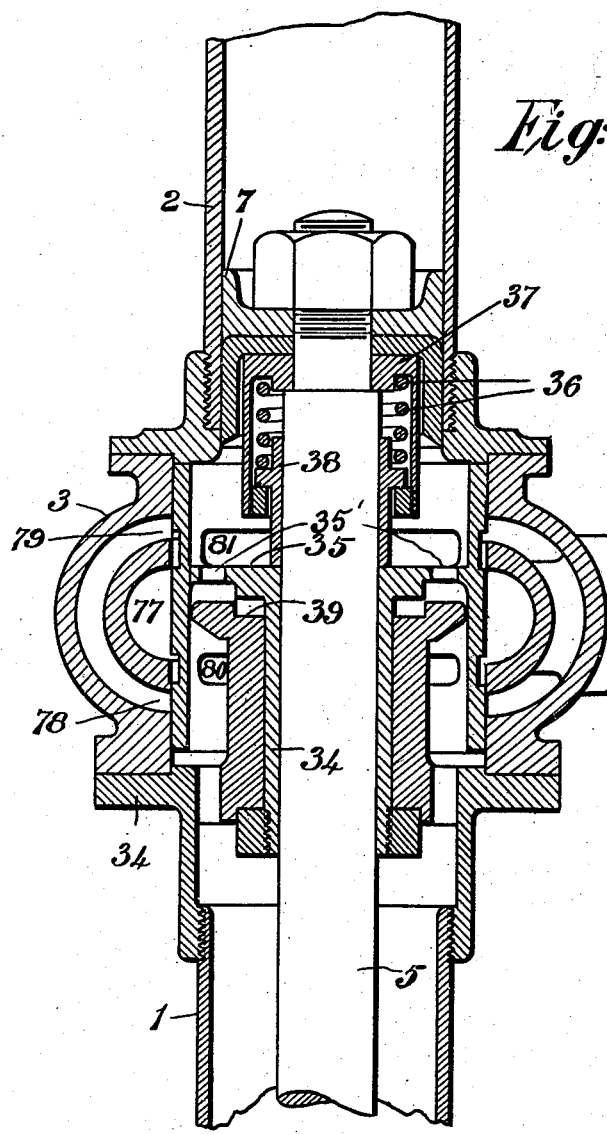

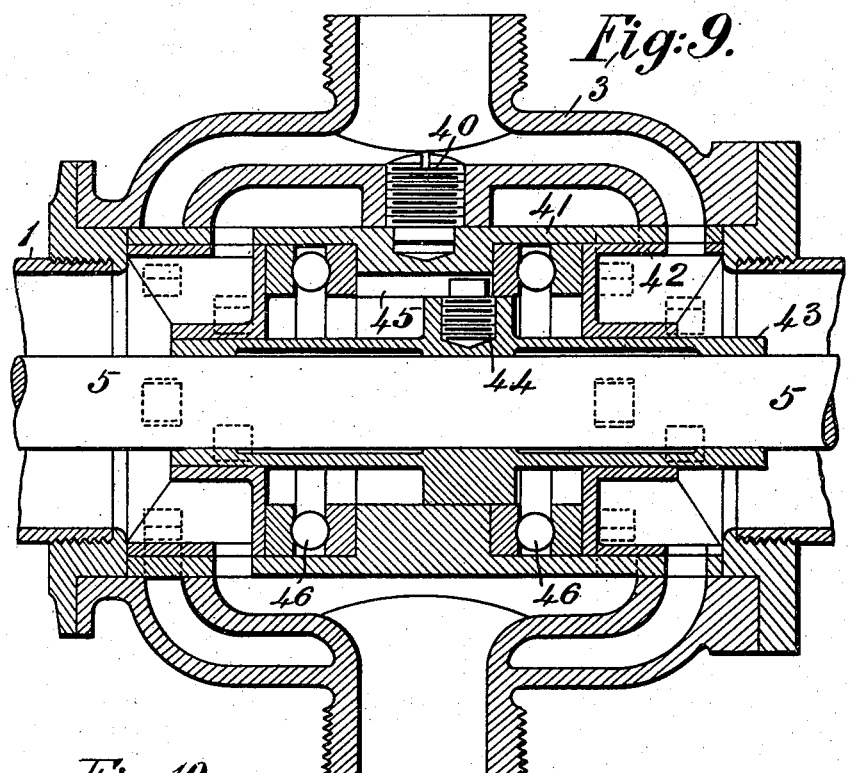
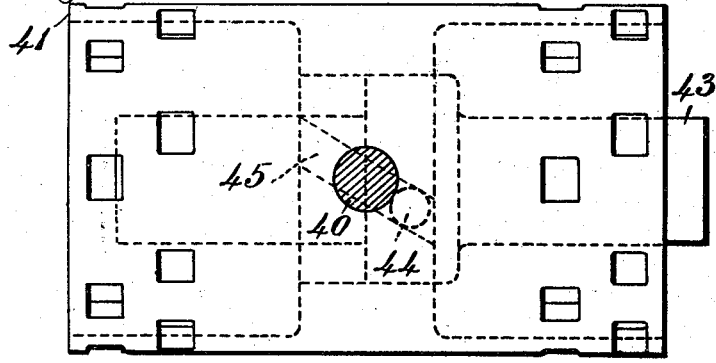

UNITED STATES PATENT OFFICE.

JEAN ZWICKY, OF SOUTH TOTTENHAM, ENGLAND.

PUMP, ENGINE, AND THE LIKE.

1,203,682.  Specification of Letters Patent.  Patented Nov. 7, 1916.

Application filed February 11, 1915. Serial No. 7,610.

*To all whom it may concern:*

Be it known that I, JEAN ZWICKY, a citizen of the Republic of Switzerland, residing at 66 Chester road, South Tottenham, in the county of Middlesex, England, have invented new and useful Improvements in Pumps, Engines, and the like, of which the following is a specification.

This invention relates to improvements in pumps and fluid pressure motors and especially to the valve mechanism thereof. Its purpose is to secure that the flow of fluid shall proceed with as little restriction and deviation as possible, whereby efficiency is obtained, and, in the case of a pump, the ability to deal with muddy fluids and even with fluids containing solid material of coarse grain.

Another purpose of the invention is to attain simplicity in the construction of the pump or motor.

Yet other purposes of the invention are to provide effective suction and force pumps, and reliable water meters.

The invention consists in a pump or motor comprising two working cylinders in axial alinement, with a piston in each upon a common piston rod, and with ports and means controlling them located between the cylinders, the ports allowing egress from the cylinders on all sides.

The invention further consists in a construction of pump or motor in which the two co-axial cylinders are joined by a separate casting formed with an interior cylindrical ported surface, within which moves a valve member.

Also the invention comprises a suction pump with a port-control or valve mechanism, which consists of a valve member operating to cut off outlet ports from the working cylinders or to uncover the same, and formed with passages leading from the inlet ports to the respective cylinders; together with one-way valves seating upon the said member and closing the passages.

The invention includes, too, a force-pump having means for closing the outlet ports before the respective pistons cease to exert pressure on the fluid; and a combined suction and force pump characterized by the features indicated.

Finally the invention comprises a construction of motor designed to serve as a meter; and means for causing the valve-member of such motor to complete its travel when once it has gone half-way.

These and other features of the invention are more particularly described hereinafter and pointed out in the accompanying claims.

Examples of pumps, engines and meters constructed according to the invention are illustrated in the accompanying drawings, in which—

Figure 2:
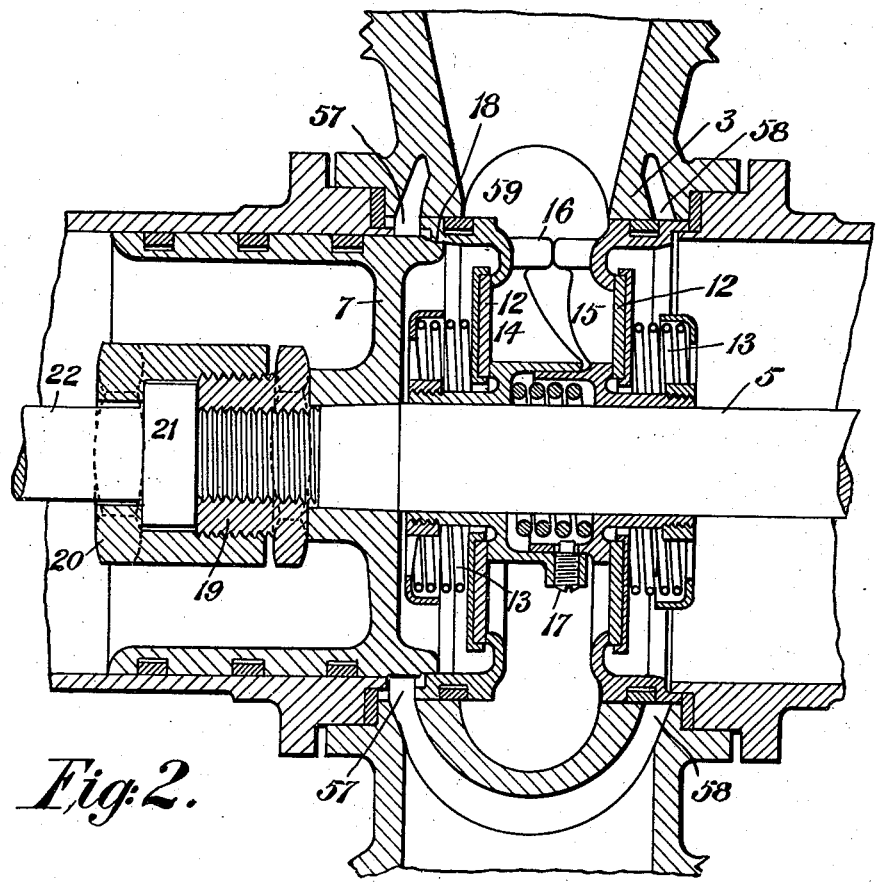
Figure 3:
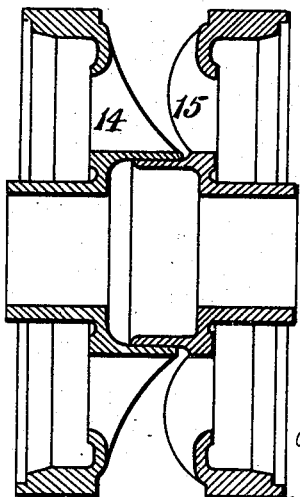

Figure 1 is a partial longitudinal section of a lift and force pump. Fig. 2 is a longitudinal section of a second form of lift and force pump, only one piston being shown. Fig. 3 is a section of the valve structure of Fig. 2 on a plane at right angles. Fig. 4 is a section of a third form of lift and force pump only one half of the valve and pistons being shown. Fig. 5 is a longitudinal section of a combined air compressor and lift and force pump. Fig. 6 is a section of a pump designed for power operation, only one half the valve being shown. Fig. 7 is a section of a motor designed for use as a water meter. Fig. 8 is a section of a second form of water meter. Fig. 9 is a section of a construction with a rotating valve. Fig. 10 is an elevation of the valve removed.

Fig. 1 is typical of all the constructions according to the invention inasmuch as the apparatus, in this case a pump, consists of two cylindrical parts 1, 2, united by a central junction piece 3 which contains inlet and outlet passages. In Fig. 1 the cylindrical parts 1 and 2 are flanged to be bolted to the casting 3, layers of dermatin or other packing material 4 being interposed to secure a tight joint. The inner surface of the casting 3 is cylindrical and contains three rows of ports of which the two outer ports 51, 52 connect with an outlet passage while the inner port 53 is joined to an inlet passage. This cylindrical surface forms the seating for a valve structure movable upon the piston rod 5, the rings 6 interposed between the cylindrical flanges and the center casting limiting the travel of the valve. The piston rod 5 carries two pistons 7 (only one being shown) and projects through the end of cylinder 1 without, however, requiring to be packed in fluid-tight fashion. It is joined by a link 8 to a hand lever 9 pivoted upon a rod 10 which is hinged to the casting 3. The outer end of cylinder 2 is attached to a suitable stand. The valve structure of Fig. 1 consists of a single casting 11 which has an outer cylindrical flange fitting the valve seating formed on the casting 3 and an inner cylindrical sleeve fitting the piston rod 5. A single row of ports 54 in the outer flange is always in register with the inlet port 53 of the casting 3, and channels formed in the casting 11 connect these center ports with ports 55 and 56 opening laterally into the two cylinders and normally closed by valves 12 pressed upon their seatings by springs 13 engaged between the valves and collars screwed upon the ends of the inner sleeve of casting 11. The length of the outer flange of the casting 11 is such as to leave one of the outer rings of ports 51, 52 in casting 3 fully exposed when the other is closed. In the position shown in Fig. 1 the pistons are about to begin their movement toward the operating lever. As the fluid cannot escape from the cylinder 2 this movement will cause fluid to exert pressure upon the valve casting 11 and move this member over to its other extreme position. The cylinder 2 will then be connected with the outlet through ports 52, while in the cylinder 1 below the piston 7 a vacuum will be created which will cause the opening of the corresponding valve 12 and admission of fluid through it. It will be observed that valve 12, that is, the connection of the cylinder to the inlet port 54, closes immediately motion of the pistons ceases and not merely when the motion of the pistons reverses. This enables the pump to draw fluid from very considerable depths or to operate successfully as a suction pump with gases.

In the construction of Fig. 2 the seating face of the central casting 3 is made of greater diameter than the cylinder. The valve casting is in two portions 14, 15, each, as indicated, fitting the piston rod and the one engaging over the other. Projections 16 on these two castings abut against each other when the parts are compressed together against the action of the central spring shown. The two parts are prevented from relative rotation by a set screw 17. The edges of the outer cylindrical part of the valve castings are adapted to fit between the casting 3 and the respective cylinders, which gives a cushioning effect to the motion of the valve. Further the pistons 7 are adapted to fit within the cylindrical parts of the valve, preferably upon conical surfaces as indicated at 18. The purpose of this arrangement is to secure closing of the outlet port 57 or 58 before the movement of the piston reverses, in fact, at any time when motion of the piston ceases, so that there can be no return of fluid at the beginning of the stroke. It is only when movement of the piston is causing compression of the fluid that the center spring can be compressed and the two parts of the valve member brought together so as to uncover the outlet port. There are as before valves 12 pressed on their seatings by springs 13, interposed between the inlet port 59 and the respective cylinders. In this, as in all constructions, the part of the valve casting fitting the piston rod may be recessed at intervals with a view to preventing leakage along the rod. The large central recess accommodating the spring which presses the members 14, 15 apart of course serves this purpose also. The piston rod 5 in this arrangement is tapered near each end and threaded at the extreme ends. On each tapered portion fits a piston 7 held in place by a nut. Connection to the operating mechanism is made by threading the outer surface of the nut 19 and screwing upon it a flanged nut 20 which engages over a collar 21 upon the rod 22 which is linked as in the previous construction to an operating lever.

In the modified valve structure shown in Fig. 4 the valve is made up of three parts. The non-return valves are formed by flanges 23 on sleeves which fit the piston rod. These flanges have an annular seating upon the member 24 which fits the cylindrical seating of the valve casting 3 and is guided solely by that casting. The seatings of valves 23 may be made tight by rings of dermatin, rubber or the like 25 let into the parts 23 or 24, and similar insets may be provided at 26 in the adjacent ends of the cylinders to cushion and make joint with the moving valve member 24. 60 is the inlet and 61, 62 the outlet ports.

Yet another modification of the valve structure is shown in Fig. 5, the two inner parts 27, 28 sliding one over the other and being pressed together and therefore upon their seatings by a single spring 29. The inlet port is 63, and the outlet ports 64, 65. This figure shows further a lift and force pump according to the invention combined with a gas compressor for the purpose of supplying proportioned quantities of say air and water mixed together. For this purpose the lower end of the cylinder 1 is closed in gas-tight fashion so that the lower piston 7 operates not only as a piston of the water pump, but also as an air pump piston drawing air through the non-return inlet valve 30, and forcing it through the non-return valve 31. It will be obvious that the lower portion of cylinder 1 could be made, if desired, of different diameter with a piston modified to fit it so as to provide any desired proportion between the two fluids supplied.

Fig. 6 shows a pump built for comparatively high speed operation by power and in this the non-return valves are dispensed with. There are as before two cylinders 1, 2, joined by a valve casting 3, the joints between the cylinders and casting being made tight by packing 4. The piston rod 5 unites two pistons 7. The valve comprises a single member 32 having two sets of ports 66, 67 opening directly into the respective cylinders. In the valve casting 3 there are inlet ports 68, and outlet ports 69, 70.

The construction of Fig. 7 operates as a motor, being designed to serve as a water meter. Water is admitted through the inner part 71 of the valve casting 3 and leaves through the two outer rings of ports 72, 73. In the position shown the pistons are just finishing their upward movement. A small opening 33 is just being uncovered by a reduced portion of the piston rod so as to admit water to cushion the end of the piston stroke and thrust over the valves 76. When the stroke is completed the valve will afford direct connection between the inlet port 71 and the lower cylinder through the ports 74, while the upper cylinder will be open to the outlet 73, through the ports 75. Consequently the pistons will move downward, the valve remaining stationary until the stroke is nearly completed. When the upper piston cushions upon the valve 76 it will move it downward sufficiently to close the outlet port 73, and then fluid will pass from the inlet port 71 by way of the reduced portion of the piston rod, through opening 33. This will cushion the end movement of the piston and thrust back the valve to its lowermost position.

It will be seen that the movement of the valve occurs in the case of a motor at the end of the stroke, being brought about by the collision of the piston with it, in other words by the pressure of the fluid on the side toward which it is moved. It follows that the piston area must be greater than the area of the valve structure exposed to fluid pressure, and by suitable adjustment of these areas any desired force may be left available for the movement of the valve. This further appears from Fig. 8 where there is added to the center casting between the cylinders a part 34 which fits between the inner and outer cylindrical portions of the valve structure 35 and forms a fixed abutment taking the greater part of the water pressure, the valve 35 being formed with openings 35' for this purpose. There is moreover a spring 36 arranged within a cap 37 between the piston and the part 38 which abuts upon the valve member. The abutment 34 is recessed at 39 to receive a part of the valve member 35 for cushioning purposes. 77 is the inlet and 78, 79 are the outlet ports. The valve has two rings of ports 80, 81. In the position shown the piston is finishing its movement downward and the part 38 has just collided with the valve member 35. In continuing its movement it will at first compress the spring 36 without moving the valve member 35, such movement being resisted by the fluid pressure on the lower end of the valve member so far as that end is left exposed by the abutment 34. When the spring 36 is sufficiently compressed the valve 35 will begin to move and as soon as the left hand cylinder is cut off from the inlet the motion of the valve will be completed by the extension of the spring 36 to its original condition. The two pistons then move upward, the valve remaining stationary until the member 38 upon the left hand end of the piston rod abuts upon the valve 35, when the valve is shifted to the right in similar fashion after initial compression of the left hand spring 36, its motion being completed by the expansion of the spring.

Figs. 9 and 10 show how the necessary opening and closing of ports may be brought about by rotation of a ported member instead of by its longitudinal movement. Within the center casting 3 and attached to it by a stud 40 so as to be non-rotatable is a sleeve 41 having four rows of ports as indicated in Fig. 10. There are two rows at each end and the ports of one row are staggered with respect to those of the next. Within the sleeve 41 are rotatable sleeves 42 connected in such a way to a sleeve 43 fitting the piston rod as to be movable relatively to it longitudinally but not circumferentially. The member 43 carries a stud 44 extending upward into a slanting cam slot 45 in the member 41. Thrust bearings 46 may be interposed between the fixed member 41 and the rotatable parts 42. The sleeves 42 each have two sets of ports, the two sleeves being so arranged relatively to each other that if the ports of one are in register with the inlet ports in the sleeve 41 the ports of the other will be in register with outlet ports. In the position shown the left hand cylinder is connected with the inlet and the right hand with the outlet. At the end of the stroke the right hand piston will strike the member 43 and move it to the left. The pin 44 will in this movement cause a partial rotation of the sleeves 42 so as to reverse the connections between the cylinders and the inlet and outlet ports. If desired there may be a safety valve in the wall which separates the inlet and outlet ports to permit escape of fluid if the pressure rises beyond a predetermined limit.

It will be obvious from the examples given that pumps and meters according to the invention are capable of considerable variation in detail, and it will be understood that features shown in one form of construction may be employed so far as they are useful in another.

What I claim is:—

1. A pump or fluid motor comprising in combination two working cylinders in axial alinement, a separate detachable casting uniting said cylinders and having an interior cylindrical face formed with ports completely around its circumference, a cylindrical valve member moving on said interior face and coöperating with the ports, pistons sliding in said cylinders, and a piston rod connecting said pistons.

2. A pump or cylinder comprising in combination a pair of working cylinders in axial alinement, a cylindrical valve chamber separating the said cylinders and having a ported inner cylindrical surface larger in diameter than said cylinders, a piston valve in said valve chamber coöperating with said interior surface, a piston in each of said cylinders, and a piston rod connecting said pistons.

3. A pump or fluid motor comprising in combination two working cylinders in axial alinement, a valve chamber separating said cylinders and provided with an interior cylindrical surface having a ring of ports completely around its circumference, a cylindrical piston valve sliding on said inner surface and coöperating with said ports, pistons in said cylinders and a piston rod connecting said pistons.

4. A water meter comprising two cylinders in axial alinement, a ported surface located between said cylinders and connected with inlet and outlet channels, a valve member located within said surface and controlling its ports, and means for causing said valve member to be completely thrust over and brought into operation when the valve member is moved through half of its travel.

5. A suction pump comprising two cylinders in axial alinement, a ported surface located between said cylinders connected with inlet and outlet channels, a piston in each cylinder, a piston rod joining said pistons, a valve member within said surface controlling its ports, and a one-way valve located between the inlet channel and each cylinder.

6. A suction pump comprising two cylinders in axial alinement, a piston in each cylinder, a piston rod joining said pistons, a ported surface located between said cylinders connected with inlet and outlet channels, a valve member within said surface controlling its ports and having passages therein extending from the inlet ports toward each cylinder, and spring-pressed valves seating upon said member closing said passages.

7. A suction pump comprising two cylinders in axial alinement, a piston in each cylinder, a piston rod joining said pistons, a cylindrical ported surface located between said cylinders and connected with inlet and outlet channels, a valve member moving upon and guided by said cylindrical surface and controlling its ports and having passages therein extending from the inlet ports toward either cylinder, valves located on opposite sides of said valve member and having seatings upon the ends of said passages and a spring pressing said valves together and so upon their seatings.

8. A suction pump comprising two cylinders in axial alinement, a piston in each cylinder, a piston rod joining said pistons, a cylindrical ported surface located between said cylinders and connected with inlet and outlet channels, a valve member moving upon and guided only by said cylindrical surface and controlling its ports and having passages therein extending from the inlet ports toward either cylinder, valves located on either side of said valve member guided by and slidable along said piston rod and having seatings upon the ends of said passages, and a spring pressing said valves together and so upon their seating.

9. A force pump comprising two cylinders in axial alinement, a piston in each cylinder, a piston rod joining said pistons, a cylindrical ported surface between said cylinders connected with inlet and outlet channels, a valve member movable upon and guided by said surface and controlling its ports, and means for closing the outlet ports before the respective pistons cease to exert pressure on the fluid.

10. A force pump comprising two cylinders in axial alinement, a piston in each cylinder, a piston rod joining said pistons, a cylindrical ported surface located between said cylinders and connected with inlet and outlet channels and having two rings of outlet ports and an expansible valve member guided by said surface and movable along it to uncover either ring of outlet ports, and yielding means normally expanding said valve member to cover both rings of outlet ports.

11. A force pump comprising two cylinders in axial alinement, a piston in each cylinder, a piston rod uniting said pistons, a ported surface located between said cylinders and connected with inlet and outlet channels, a valve member in two portions movable upon and guided by said surface and controlling the ports thereof and a spring pressing the portions of said valve member apart so as normally to close the outlet ports.

12. A force pump comprising two cylinders in axial alinement, a piston in each cylinder, a piston rod joining said pistons, a cylindrical ported surface between said cylinders connected with inlet and outlet channels, a valve member movable upon and guided upon said cylindrical surface and adapted to receive and make joint with the piston ends.

13. A suction and force pump comprising two cylinders in axial alinement, a piston in each cylinder, a piston rod joining said pistons, a cylindrical ported surface between said cylinders connected with inlet and outlet channels, a valve member movable upon and guided by said surface and controlling its ports, a one-way valve located between the inlet channel and each cylinder, and means for closing the outlet ports before the respective pistons have ceased to exert pressure upon the fluid.

14. A suction and force pump comprising two cylinders in axial alinement, a piston in each cylinder, a piston rod joining said pistons, a cylindrical ported surface between said cylinders connected with inlet and outlet channels, a valve member movable upon and guided by said surface, controlling its ports, adapted to receive and make joint with the piston ends, and having passages extending from the inlet ports toward either cylinder, and spring-pressed valves seating upon the ends of said passages.

15. A suction and force pump comprising two cylinders in axial alinement, a piston in each cylinder, a piston rod joining said pistons, a cylindrical ported surface between said cylinders connected with inlet and outlet channels, a valve member in two portions movable upon and guided by said surface, controlling its ports, and having passages extending from the inlet ports toward either cylinder, spring-pressed valves seating upon the ends of said passages, and a spring normally pressing the portions of said valve member apart.

In testimony whereof I have signed my name to this specification in the presence of two subscribing witnesses.

JEAN ZWICKY.

Witnesses:
A. E. O'DELL,
LEONARD E. HAYNES.

Copies of this patent may be obtained for five cents each, by addressing the "Commissioner of Patents, Washington, D. C."